S. H. GOLDBERG.
MACHINE FOR FORMING HAIRPINS OR SIMILAR ARTICLES.
APPLICATION FILED FEB. 23, 1918.

1,414,080.

Patented Apr. 25, 1922.

UNITED STATES PATENT OFFICE.

SOLOMON H. GOLDBERG, OF CHICAGO, ILLINOIS, ASSIGNOR TO THE HUMP HAIRPIN MANUFACTURING COMPANY, OF CHICAGO, ILLINOIS, A CORPORATION OF WEST VIRGINIA.

MACHINE FOR FORMING HAIRPINS OR SIMILAR ARTICLES.

1,414,080.      Specification of Letters Patent.     Patented Apr. 25, 1922.

Application filed February 23, 1918. Serial No. 218,628.

*To all whom it may concern:*

Be it known that I, SOLOMON H. GOLDBERG, a citizen of the United States, residing in the city of Chicago, county of Cook, and State of Illinois, have invented certain new and useful Improvements in Machines for Forming Hairpins or Similar Articles, of which the following is a specification.

This invention relates to a new and improved machine for forming hairpins or similar articles from a reel or other continuous supply of wire stock, although the invention in certain of its aspects is not limited to use with a continuous machine.

In general the type of machine to which my invention relates is one in which the hairpin or similar article is automatically severed and formed into the desired shape while being advanced through the machine and among the salient objects of the invention are to provide improved mechanism whereby the wire is fed forward, straightened, severed, its severed ends ground or polished and is then bent and crimped into its final shape without the necessity of any manual control other than starting the machine. Other objects of the invention are to permit the formation of hairpins or similar articles of different lengths by making a comparatively simple adjustment in the machine; to provide improved means for compensating for wires of different thicknesses; to provide the construction in which the size and shape of the crimp can be readily changed without materially altering the machine; to provide a novel and improved wire feed and adjustment therefor; to provide improved feeding and straightening mechanism and particularly to provide a quick release for the straightening mechanism and thus facilitate the starting-in of a new wire in the machine or removal of the wire in case the machine should become clogged or otherwise inoperative; to provide improved head forming mechanism for the pin and to so construct and arrange the parts that they can be readily adjustable to compensate for the use of wire of different sizes. The invention also resides in the novel construction of the pin advancing conveyor or chain; in the construction and operation of the spring finger guides for wire after leaving the cutters and in other features of construction and arrangement and combination of parts hereinafter described.

Taking up in detail the particular construction disclosed in the drawings, 1 designates the frame of the machine mounted upon a suitable base 2 and supporting a bed plate 3 on which the most of the mechanism is mounted. The wire coming from the reel or other source of stock (not shown), is drawn through the wire straightener 4 by means of the feeding rolls 5 and 6, is then forced upward through the guide pipe or channel 7, the upper end 8 of which forms a part of the severing mechanism. This end 8 is arranged so that the cutters 9 on the rotating head 10 will sever the wire on the plane of the upper end 8 of the conduit 7. The severed length of wire is then engaged by lugs 11 and 12 distributed around a periphery of the rotating discs 13 and 14 respectively. These discs are spaced apart a distance proportionate to the length of the individual pieces of wire and in case a pin or other article of greater length is to be produced, the upper disc 14 can be spaced a greater distance from the lower disc 13. This is accomplished by setting the disc 14 farther up upon the shaft 16 and locking the set screw 82.

Figure 1:
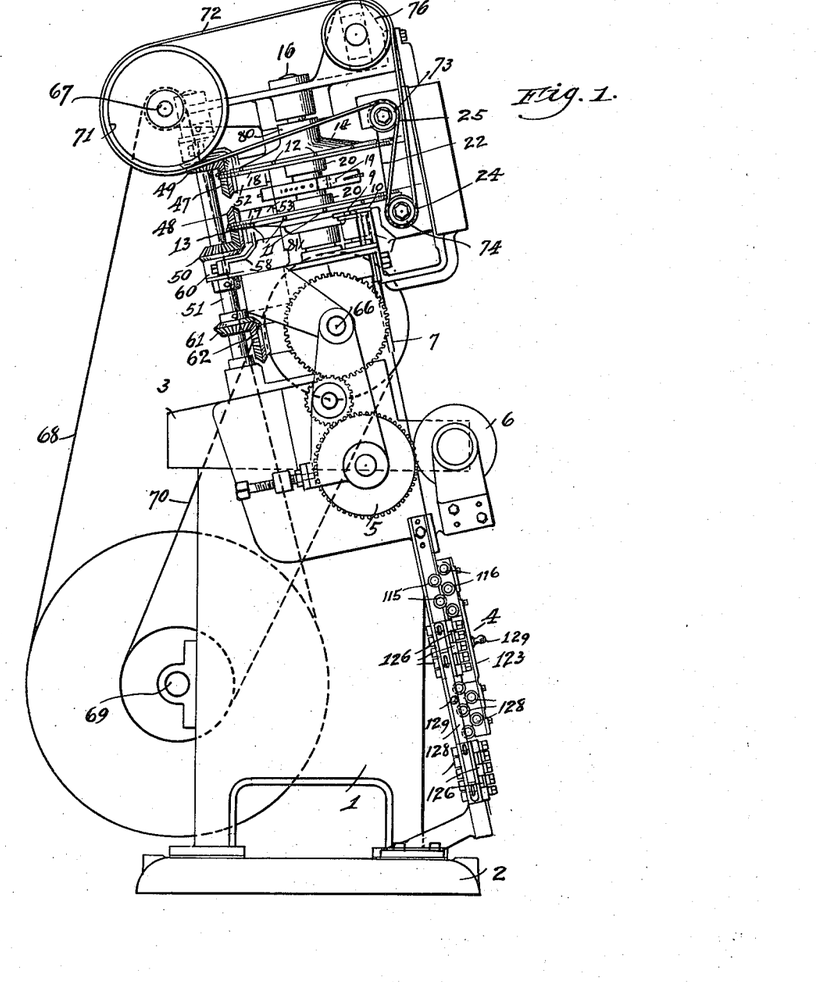
Figure 1 is an end elevational view of a machine embodying my invention, parts being omitted for the sake of clearness.
Figure 2:
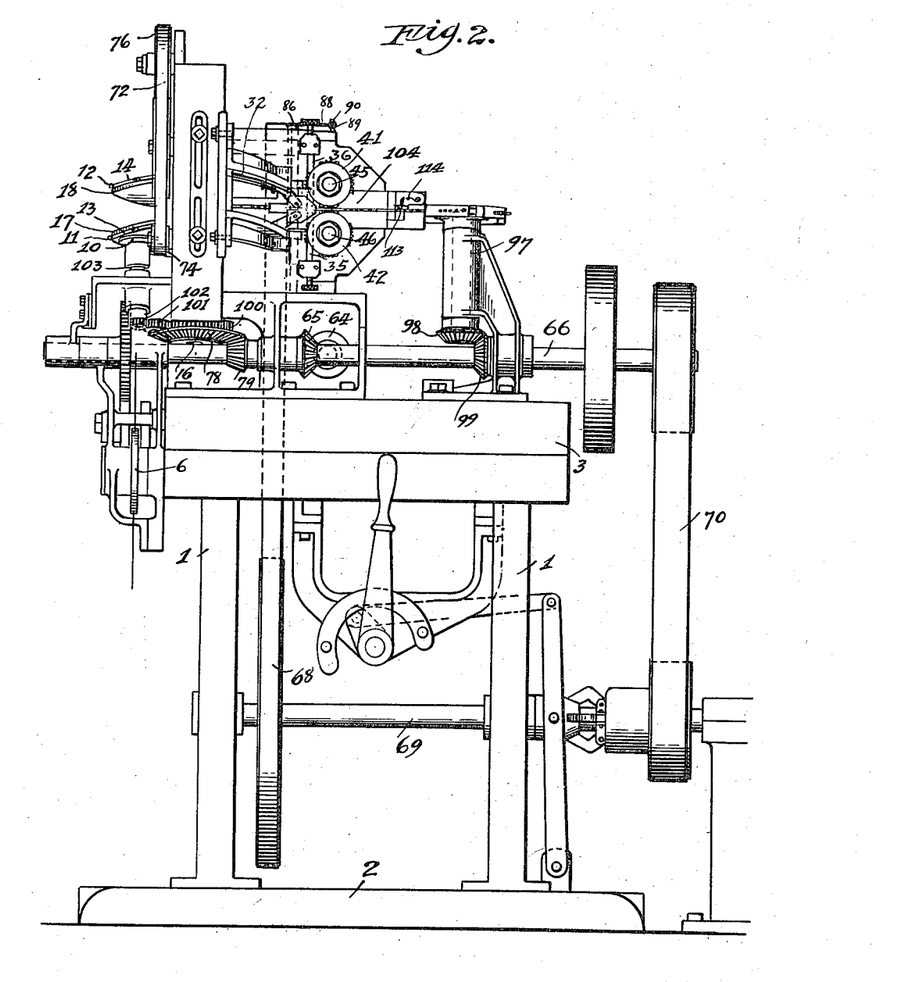
Figure 2 is a front elevational view similar to Figure 1.
Figure 3:
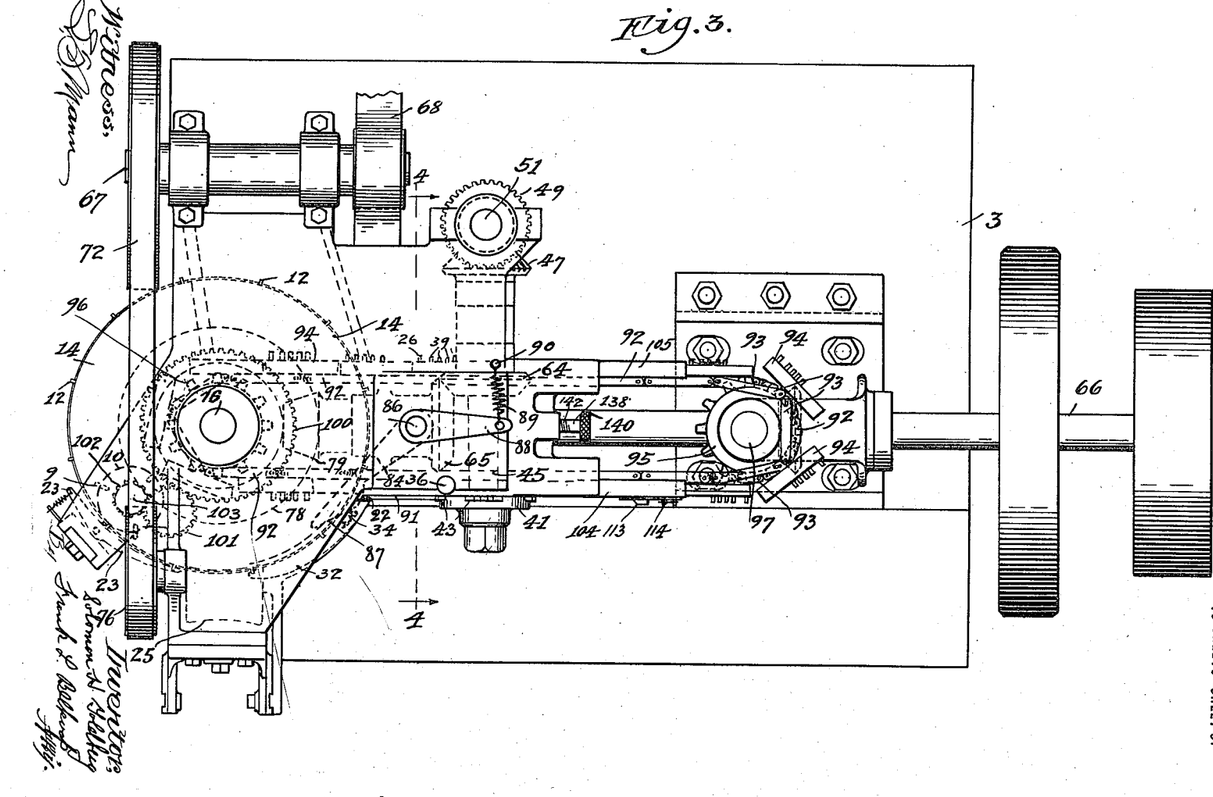
Figure 3 is a top plan view similar to Figure 1.
Figure 4:
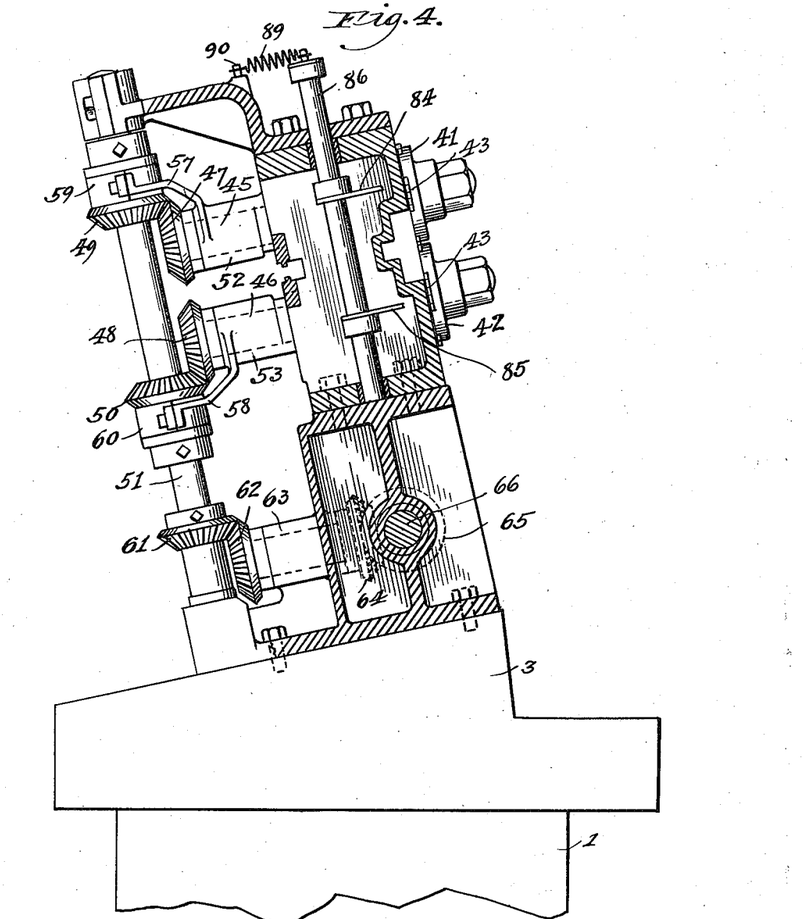
Figure 4 is a cross section view, line 4—4 of Figure 3, looking in the direction of the arrows.
Figure 5:
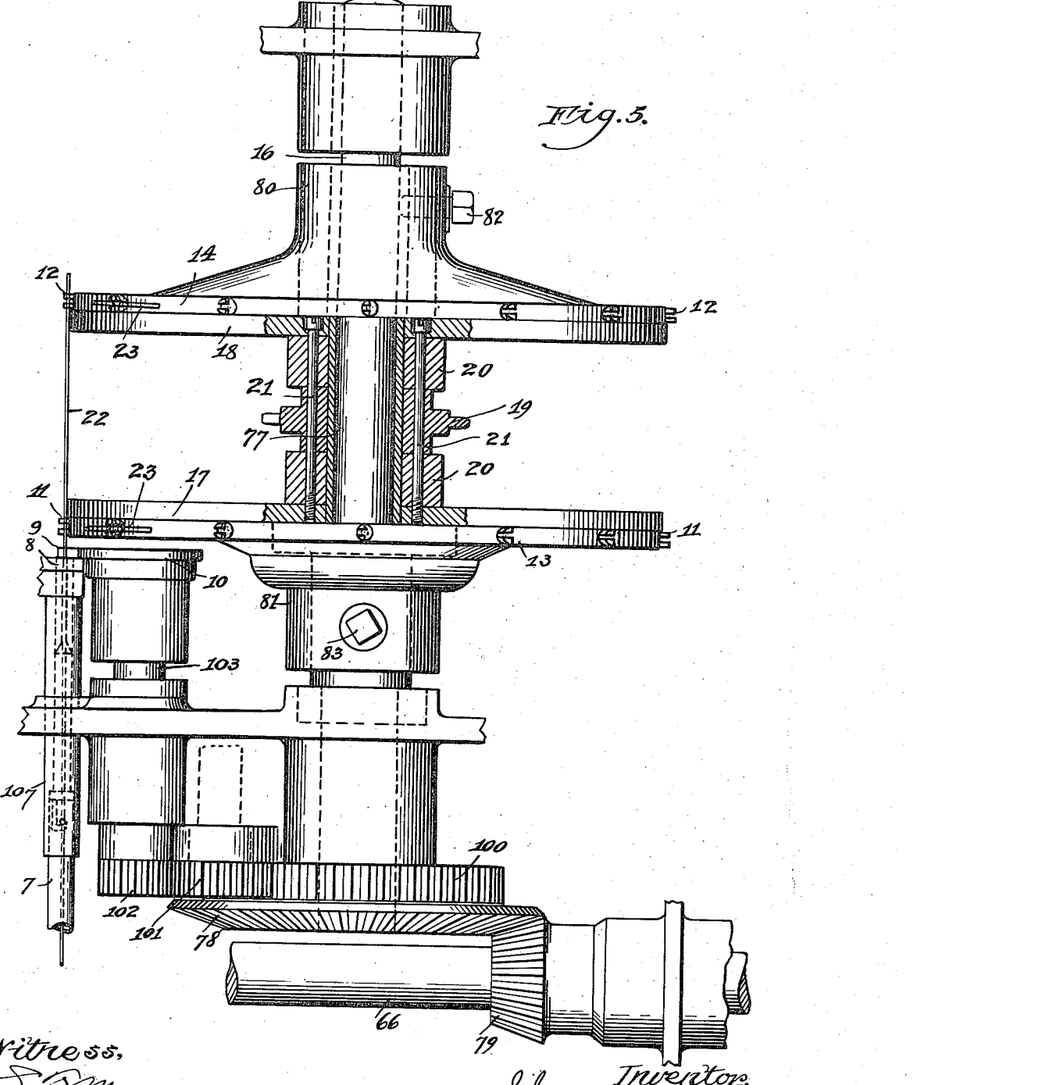
Figure 5 is an enlarged detail view partly in section showing the cutting and part of the transferring mechanism.
Figure 6:
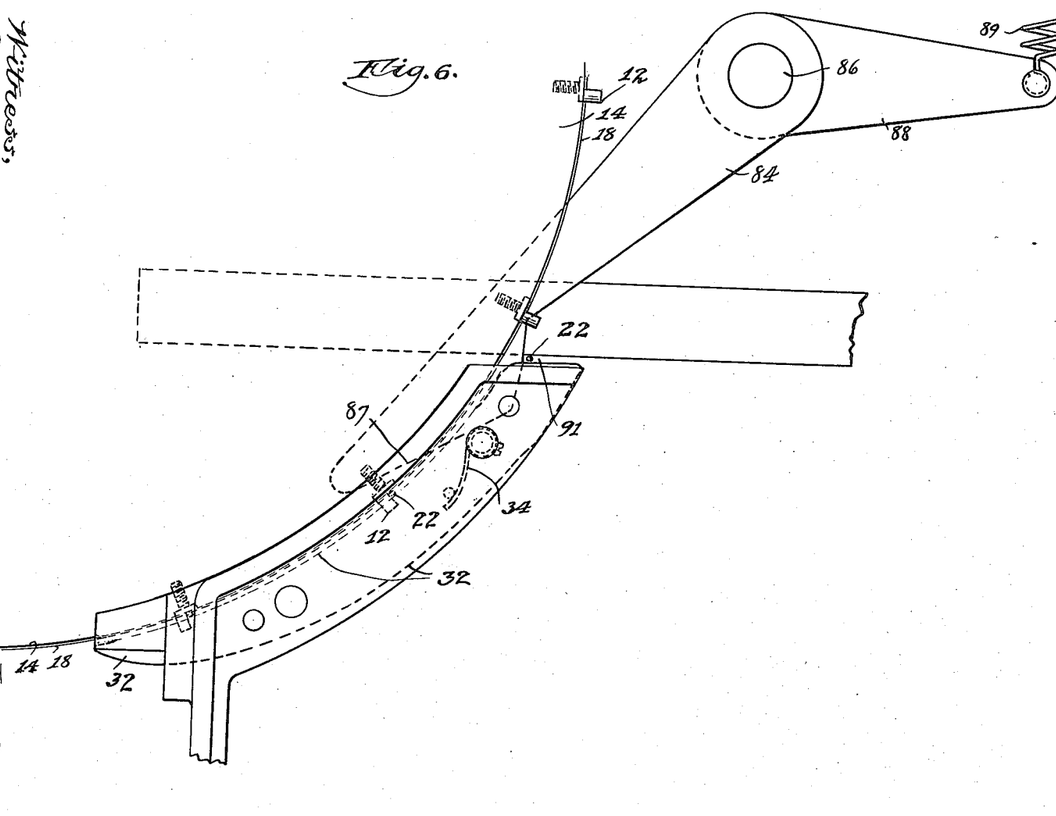
Figure 6 is an enlarged fragmentary plan view of the transfer mechanism from the feed disc to chain feed.
Figure 7:
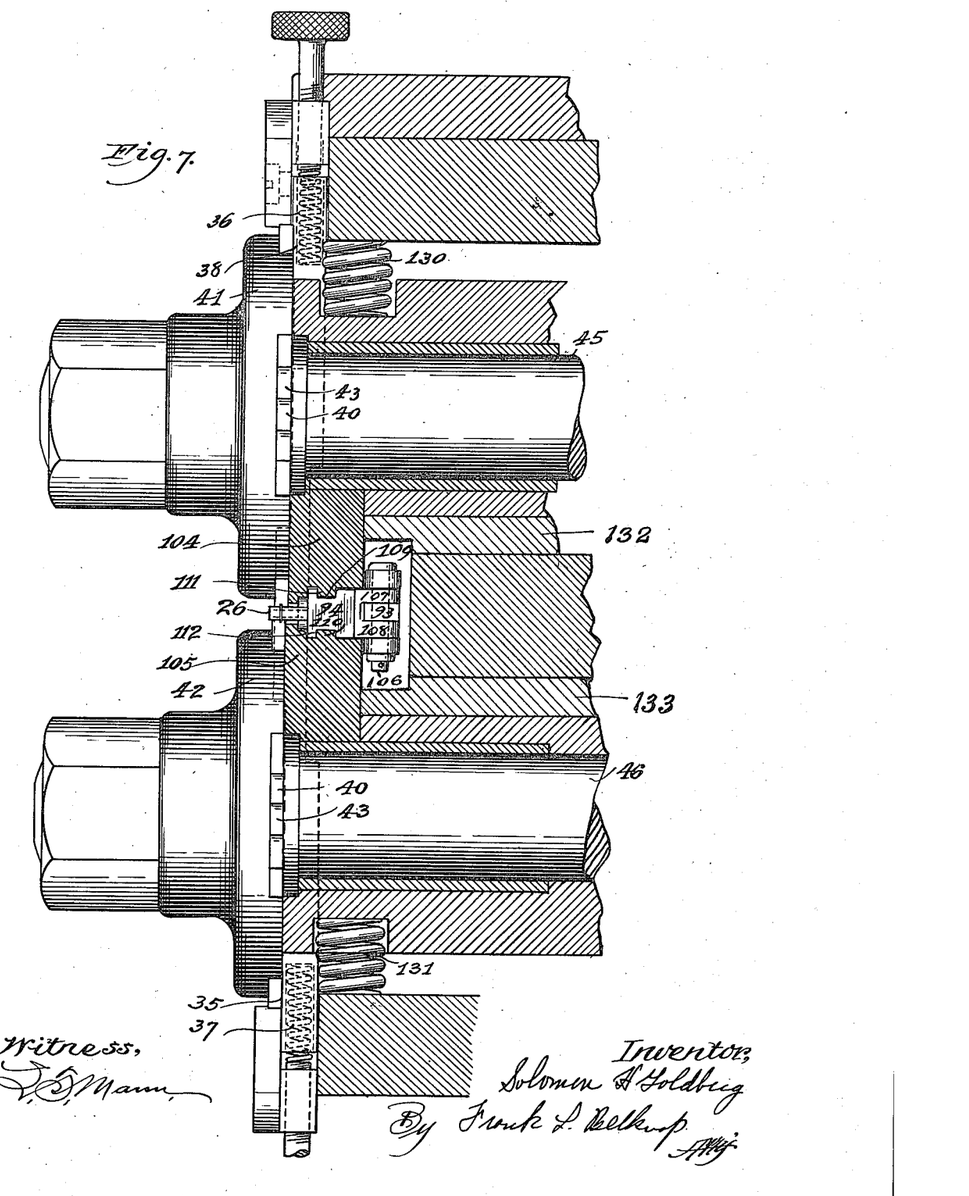
Figure 7 is an enlarged elevational view of the crimping rolls with other parts shown in section.

From the Figure 5, it will be noticed that a second pair of discs 17 and 18 are arranged intermediate the discs 13 and 14. The second set of discs are of a slightly greater diameter than the first set and are driven independently thereof by a chain drive extending over the sprocket 19. Whenever the discs 13 and 14 are adjusted a greater distance apart a similar adjustment can be made between the discs 17 and 18 by inserting additional filler members 20 and if necessary using a longer set of screw bolts 21. The purpose of driving the discs 17 and 18 at a higher rate of speed than the discs 13 and 14, is to compel the rotation of the wire length 22 about its axis simultaneously with its advancement from the point of severance to the chain feed hereinafter described. This axial rotation of the wire length is used for rounding off or smoothing the rough severed ends of the wire length after which the length is given its initial bend and transferred to the chain feed where the remaining, bending and crimping operations are performed. For retaining the wire length in engagement with the lugs 11 and 12 I employ a positive retaining device consisting of a pair of spring retaining devices, each of which has a plate or finger member 23 which fit into the grooves in the lugs 11 and 12. After passing through the filing rolls 24 and 25 the severed length is transferred from the disc feed to the chain feed as follows: the lugs 26 on the chain feed come into registration and strike against the central part of the wire length and as the chain feed departs from the disc feed, it carries with it a wire lengh, drawing the ends 27 and 28 of the wire between the initial bending devices 29 and 30. This initially bends the wire and also forms the first step in the production of the head of the hairpin. In order to retain the wire lengths into position where they can be transferred to the chain feed, I employ positive retaining devices, consisting of plates 31 and 32 which are held by springs 33 and 34 into dove-tail arrangement with the grooves in lugs 11 and 12.

After passing from the initial bending device the wire length is drawn between the spring pressed longitudinally adjustable bars 35 and 36 which are pressed towards each other by springs 37 and 38 respectively. The wire length which is still hooked over one of the lugs 26 is then drawn between the crimping rolls, the construction and operation of which is as follows: Just in the rear of the lug 26, is a plurality of lugs 39 which cooperate with detents 40 in the crimping rolls 41 and 42. In order to facilitate the use of the machine in producing hairpins or like articles of different sizes and figurations, the detents 40 are formed in removable blocks 43 which blocks are detachably fastened to the forming rolls by screws or other quick attachment means 44.

The drive for the crimping rolls 41 and 42 comprises a pair of shafts 45 and 46, which, at their opposite ends are provided with beveled gears 47 and 48 which mesh with beveled gears 49 and 50 on an upright shaft 51. The shafts 45 and 46 are supported in bearings 52 and 53 which are connected by integral brackets 57 and 58 in fixed relation to the bearings 59 and 60 of the vertical shaft. By this arrangement the greater rigidity is given to the supporting mechanism for the driving shafts and the lost motion which occurs from the use of a large number of spur gears is avoided. At its lower end, the vertical shaft 51 has a beveled gear 61 meshing with a beveled gear 62 on the stub shaft 63 which shaft in turn is driven through gears 64 and 65 from the main drive shaft 66.

At the upper end of the frame work there is arranged a counter shaft 67 which is driven by a belt 68 from the lower drive shaft 69. This shaft also has a driving connection through the belt 70 to the main drive shaft 66 for the forming rolls. Mounted on the shaft 67 is a belt wheel 71 over which there extends a belt 72. This belt extends around the pulley 73 which drives the file roll 25 and is then looped around the pulley 74 so as to drive the file roll 24 in the opposite direction. From the roll 74 it is continued over a tension adjusting roll 76.

As previously stated the severed lengths are carried from the point of severance to the point of transfer from the disc feed to the chain feed by means of the lugs 11 and 12 on the discs 13 and 14. The drive for the rotating discs comprises a sleeve 77 which at its lower end is provided with a beveled gear 78 which meshes with a beveled pinion 79 on the shaft 66. The discs 13 and 14 are removably mounted on the sleeve 77 by means of integral hubs 80 and 81 and are locked to rotate with the sleeve by means of set screws 82 and 83. The second pair of discs 17 and 18 are rotatably mounted or journaled on the outer surface of the sleeve 77 and are driven from a sprocket 19 or other suitable mechanism at a higher rate than the discs 13 and 14, as previously mentioned.

In transferring the wire length from the disc feed to the chain feed there is employed an automatic transfer device comprising a pair of rock arms 84 and 85 mounted on the shaft 86. Each of these rock arms are provided at their outer end with a beveled face 87 which extends diagonally in the path of the wire length 22 which is being advanced by the lugs 11 and 12, therefore as the wire lengths are advanced, they will press against the inclined face 87 of the rock arms and cause the latter to move backward and rock the pivot shaft 86. The latter has fixedly mounted on its upper end, an arm 88 which is connected by a spring 89 to a stationary lug 90. The arrangement of parts is such that whenever the pin reaches the transfer position 91, the moment it is released from the retaining fingers 31 and 32, it is automatically adjusted to move with the chain feed, the drive connection for which feed is as follows: the chain feed comprises an endless belt 92 made up of links 93 to which there is pivotally connected the blocks 94 carrying the pins 26 and 39. This chain 92 at one end, extends over a sprocket 95 and at its other end over a sprocket 96. The driving force for the chain is through the shaft 97 and beveled gear 98 which meshes with a beveled gear 99 on the shaft 66.

The shaft 66 also forms part of a drive connection for the wire cutter disc 10. This drive connection comprises a gear 100 fixed to rotate with the beveled gear 78 which is driven from pinion 79 and the shaft 66. This gear 100 through an intermediate gear 101 meshes with the gear cutter pinion 102 on the lower end of the shaft 103. From the above description it will be noticed that all of the moving parts of the machine are driven in timed relation to each other so that in case of any increase or decrease in the speed of the operation of the machine, it will not affect the relative operations of the individual mechanisms.

To properly guide the chain during this travel, it is mounted in guide bars 104 and 105 in the following manner. Attached to the blocks 94 are ears 107 and 108, which are connected by vertical pivot pins 106 to the links 93 of the endless chain. The ears 107 and 108 are spaced apart to permit of the positioning of the connecting links 93 therebetween, held in place by the pins 106, this arrangement of parts facilitating the turning of the corners when the belt or chain is driven. The blocks 94 during the greater part of their travel are in engagement with the guide bars 105 and 104 and for this purpose the blocks 94 are provided with upper and lower recesses 109 and 110 which receive longitudinal projections 111 and 112 on the guide bars 104 and 105 respectively. After the completed pin has been formed, it is carried by lugs on blocks 94 to the point of discharge where it is disengaged from the lugs and blocks by a beveled face 113 which is held in the path of the blocks by a spring 114.

Figures 10, 11, 12:
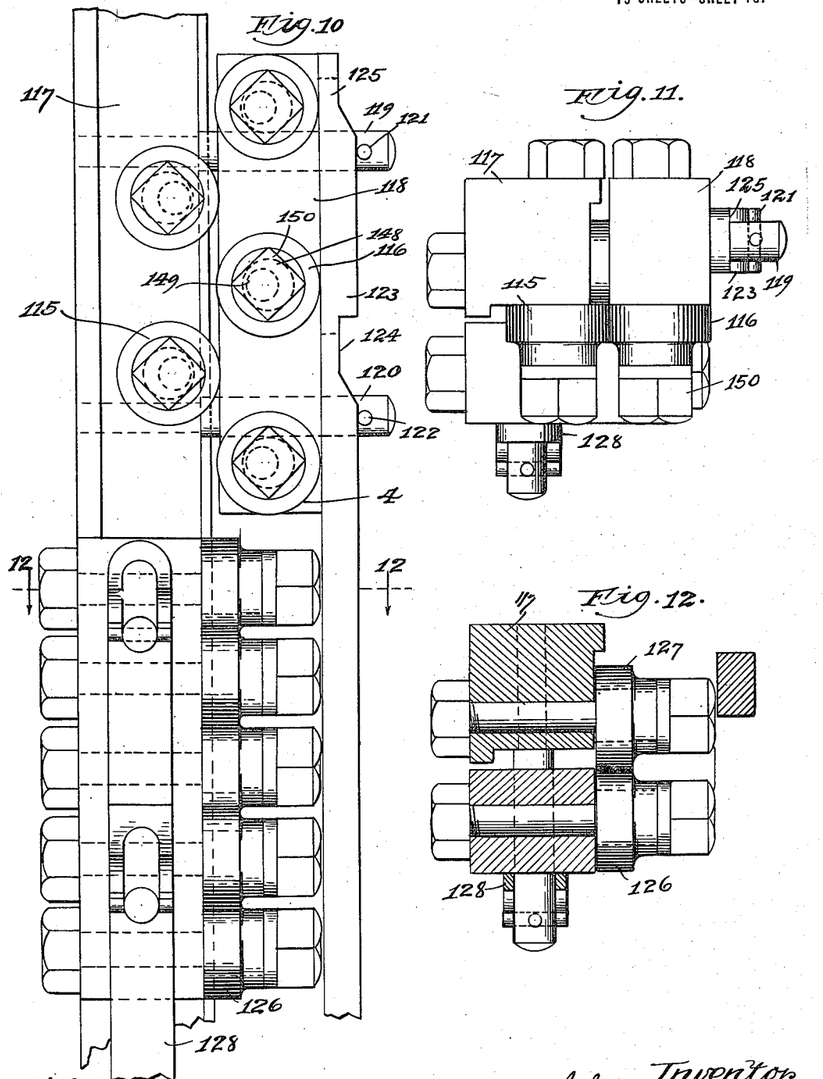
Figure 10 is an enlarged elevational view of the straightening mechanism.
Figure 11 is an end view of the straightening mechanism.
Figure 12 is the section on the line 12—12 of Figure 10 looking in the direction of the arrows.
Figure 13:
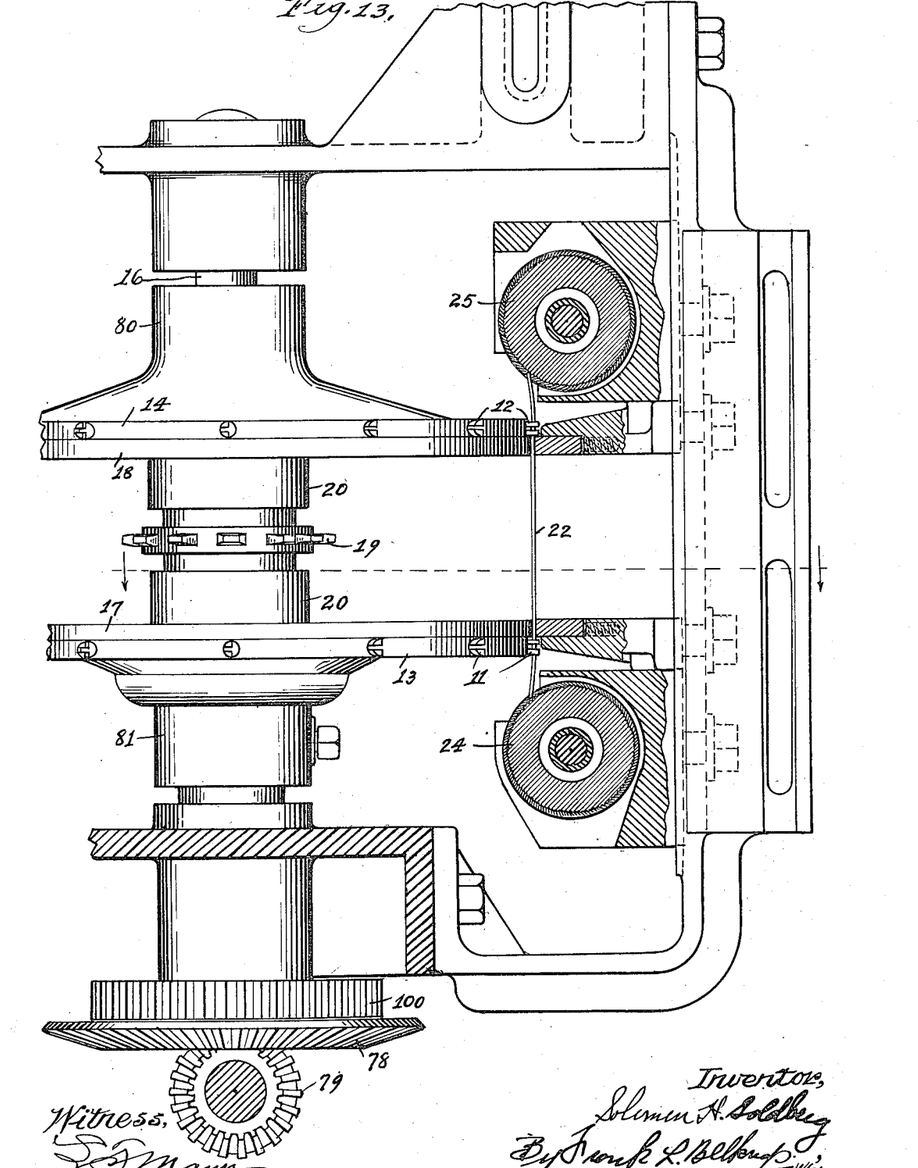
Fig. 13 is an enlarged detail view partly in section showing the filing rolls; and associated parts.
Figure 14:
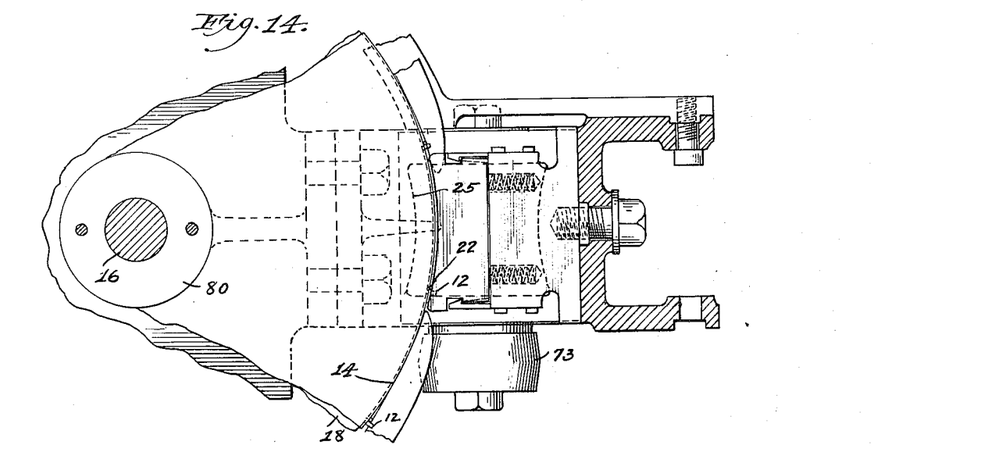
Fig. 14 is a sectional view on lines 14—14 of Fig. 13 looking in the direction of the arrows.
Figure 15:
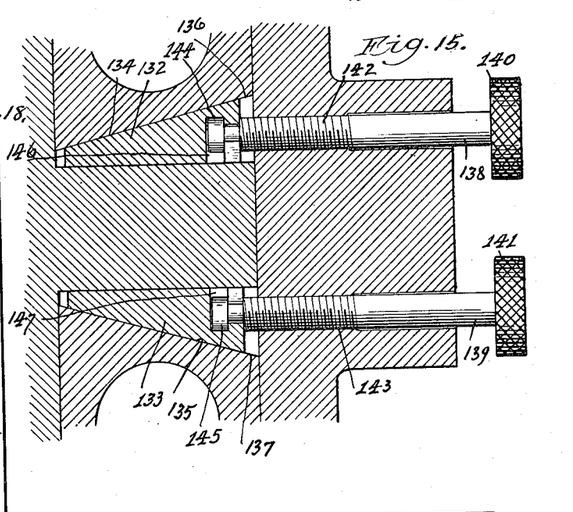
Fig. 15 is an enlarged sectional detail showing the sliding blocks and associated parts.
Figure 16:
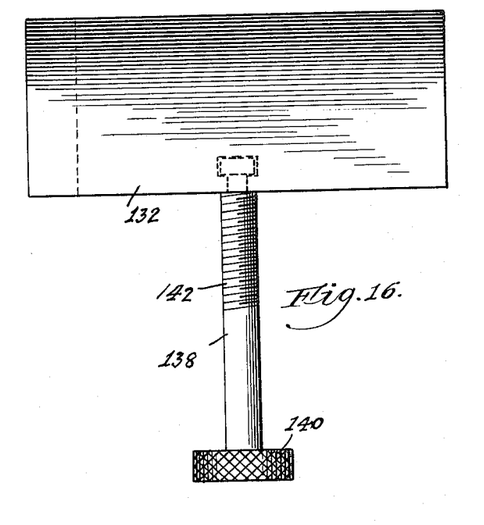
Fig. 16 is an enlarged plan view of one of the blocks and its adjusting screw.
Figures 17, 18:
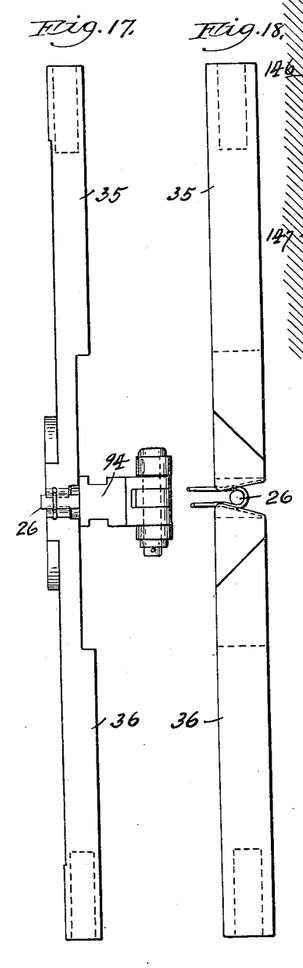
Fig. 17 is an edge view of the adjustable bars; and part of the conveyor mechanism.
Fig. 18 is a face view of the adjustable bars, showing their relation with the partly formed pin.
Figure 19:
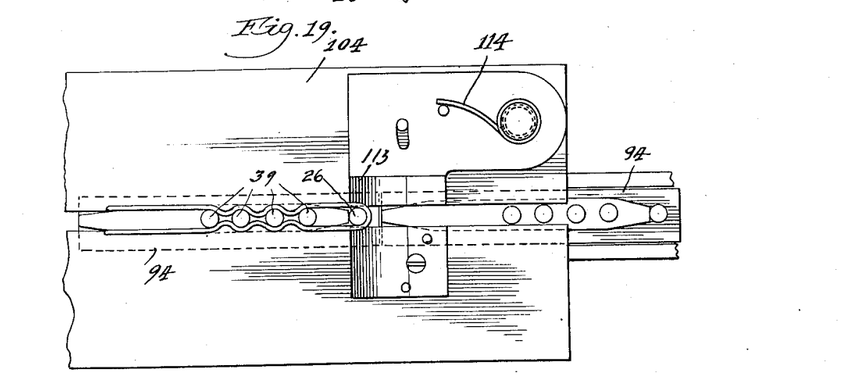
Fig. 19 is an enlarged detail view showing the relation of the releasing block with the completed pin.
Figure 20:
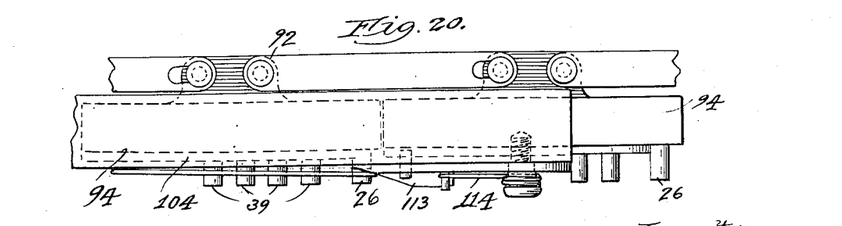
Fig. 20 is a top plan view of the parts shown in Fig. 19.

In addition to the general constructions above described, the invention further resides in the particular construction of the straightening mechanism and the quick releasing means therefor, the details of which are as follows: The straightening rolls comprise two sets of rolls 115 and 116 the former of which are mounted on a stationary block 117 and the latter upon a block 118. This last mentioned block is slidably mounted on studs 119 and 120 which have pins 121 and 122, between which and the base of the block there extends a locking bar 123. This bar is provided with notches 124 and 125; the arrangement of parts being such that when the bar is in position shown in Figure 10, the straightening rolls will be in operative relation to each other and tightly engage the wire on opposite sides. When, however, the locking bar 123 is adjusted to bring the notches 124 and 125 into registration with the pins 121 and 122, the block 118 will be free to move back away from the block 117 and thus release the tension on the wire. In addition to the bars and rolls just above described, there are alternated with such sets of rolls transversely positioned sets of rolls 126 and 127. That is, the last mentioned sets of rolls have their axes arranged at substantially right angles to that of the rolls 115 and 116 and they are also provided with a locking bar 128 having a releasing handle 129 in a manner similar to the releasing bar 123. In order to adjust the straightening rolls to accommodate wires of different diameter, the rolls 115 and 116 etc., are each mounted on an eccentric bearing 148 which is carried by stud 149. At its outer end the latter has a nut 150 which, when turned, will adjust the stud and eccentric bearing so as to advance or withdraw the rolls toward each other. This adjustment in the particular construction shown is independent of the releasing bar adjustment.

Figure 8:
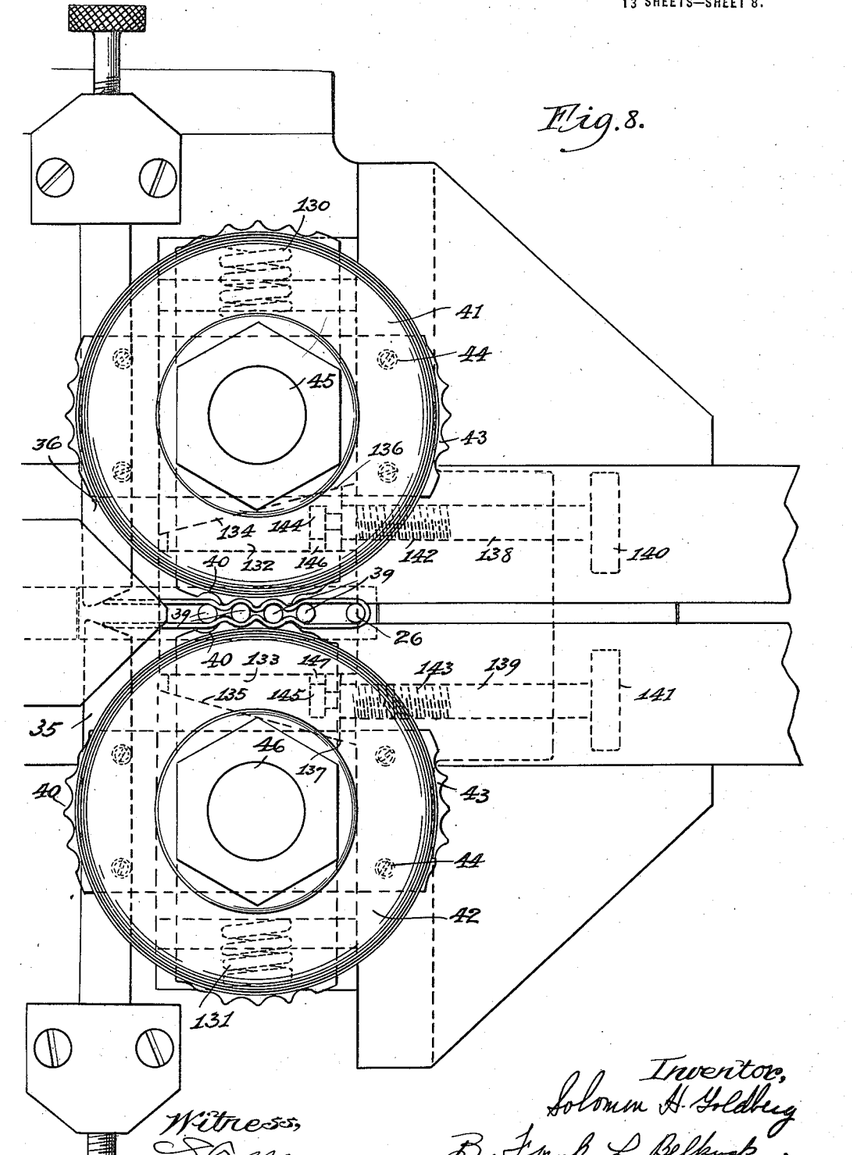
Figure 8 is an enlarged fragmentary side elevational view showing the crimping rolls in operation.
Figure 9:
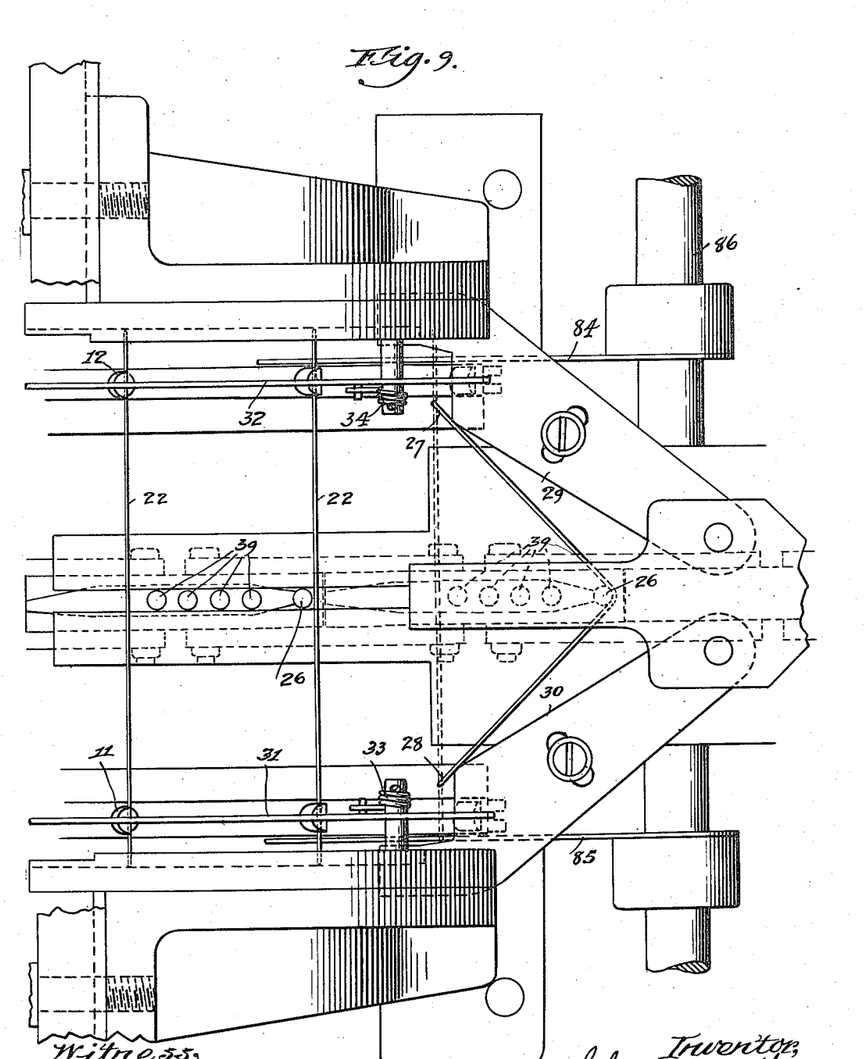
Figure 9 is a view similar to Figure 8 showing the initial transfer from the disc feed to the chain feed.

A still further feature of the invention resides in the novel adjustment mechanism for the crimping rolls 41 and 42 whereby the latter can be accurately adjusted a greater distance apart to adapt the machine for use in connection with larger size pins or pins made from wire of different gauge. Normally the blocks carrying the crimping rolls 41 and 42 are pressed toward each other and toward the pins 26 and 39 by means of coil springs 130 and 131. The amount of movement towards each other is, however, limited by sliding blocks 132 and 133, which have beveled faces 136 and 137 on the bearing blocks for the crimping rolls. These sliding blocks are adjusted in and out by means of threaded bolts 138 and 139 which have suitable knurled heads 140 and 141. These bolts have a threaded engagement at 142 and 143 with the frame work and at their inner ends have heads 144 and 145 which fit into grooves 146 and 147 in the sliding blocks. Therefore movement of the threaded bolts in one direction will withdraw the blocks to the right of position shown in Figure 8 and allow the crimping rolls to come closer together. On the other hand, an adjustment of the threaded bolts in the opposite direction will force the sliding blocks to the left and spread the crimping rolls apart. In this manner, a very accurate adjustment of the crimping rolls with reference to each other and the cooperating forming pins is obtained and this is accomplished without varying the tension on the wire.

While I have shown and described in detail certain adjustments and certain mechanisms for driving various parts of the machine, the invention is not limited to such features except as ultimately set forth in the claims.

I claim as my invention:

1. In a machine for forming hairpins or similar articles, the combination with a continuous means for feeding lengths of wire through successive stages of forming in which said wire is advanced while being held in different positions, of means for positively retaining said lengths of wire in contact with said feeding means to the point of discharge and means operable to automatically control the advancement and positioning of the wire stock during its passage through the forming stages.

2. In a machine for forming hairpins or similar articles the combination with rotating feed, of a transverse feed adapted to receive a wire length from the rotating feed, a spring tensioned member for forcing the wire length from the rotating feed to the transverse feed, and a spring pressed member arranged directly adjacent to the point of transfer for holding the wire in place in the rotating feed.

3. In a machine for forming hairpins or similar articles the combination with a feeding member having a head forming member over which the stock forming the pin or other article is bent, of cooperating head forming guides arranged substantially transversely to the direction of movement of the head forming member and adapted to contact the legs of the pin stock whereby the head is formed therein.

4. In a machine for forming hairpins or similar articles the combination with a feeding member having a head forming member over which the stock forming the pin or other article is bent, of cooperating head forming guides arranged transversely to the direction of movement of the head forming member, and springs for forcing said guides towards the head forming member whereby the pin stock is bent about the head-forming member.

5. In a machine for forming hairpins or similar articles the combination with a feeding member having a head forming member over which the stock forming the pin or other article is bent, of cooperating head forming guides arranged transversely to the direction of movement of the head forming member, and springs for forcing said guides towards the head forming member and means for varying the tension of said springs to take care of different sizes of wire or other stock.

6. In a machine for forming hairpins or similar articles the combination with a feed mechanism for advancing the length of wire or other stock, said mechanism including pivoted blocks having recesses, and a guide member having a projection fitting into said recesses for guiding the feeding member during a portion of its travel, lugs fixedly attached to said pivoted blocks for carrying the articles and adapted to cooperate in the forming thereof.

7. In a machine for forming hairpins or similar articles the combination with a feeding mechanism including a continuous conveyor having block portions provided with oppositely positioned recesses and guide mechanism including stationary projections adapted to engage said recesses during at least a portion of its travel, projecting lugs attached to said pivoted blocks for carrying the articles to be formed.

8. In a machine for forming hairpins, the combination with a wire feed, of means for successively cutting the wire in predetermined lengths, carrying mechanism for receiving said lengths, a conveyor for the lengths, and mechanism for transferring said lengths to the conveyor, cooperating means for bending the lengths to form shank portions of equal length, and compression means for crimping said shanks during the passage of the pin through the machine.

9. In a machine for forming hairpins, the combination with a wire feed, of means for successively cutting the wire in predetermined lengths, carrying mechanism for receiving said lengths, a conveyor for the lengths, and mechanism for transferring said lengths to the conveyor, cooperating means for bending the lengths to form shank portions of equal length, and compression means for crimping said shanks during the passage of the pin through the machine, said compression means comprising a pair of pressing rollers, means for adjusting the relative position of said rollers, and tension devices for urging said rollers toward one another.

10. A hairpin making machine, comprising mechanism for feeding and cutting wire in lengths from which hairpins are formed, a rotating carrier receiving said lengths, an endless conveyor, means for transferring the lengths to the conveyor, means on said conveyor for receiving the lengths to move therewith, mechanism for bending the lengths during their travel on the conveyor to form shanks of equal length, and compression means for crimping said shanks while the pin is carried by the conveyor.

11. A hairpin making machine, comprising mechanism for feeding and cutting wire in lengths from which hairpins are formed, a rotating carrier receiving said lengths, an endless conveyor, means for transferring the lengths to the conveyor, means on said conveyor for receiving the lengths to move therewith, mechanism for bending the lengths during their travel on the conveyor to form shanks of equal length, and compression means for crimping said shanks while the pin is carried by the conveyor, said compression means including compression rolls having peripheral crimping members for crimping the shank over pins carried by the conveyor, and means for maintaining said rolls in operative relation.

12. A hairpin making machine, comprising mechanism for feeding and cutting wire in lengths from which hair pins are formed, a rotating carrier receiving said lengths, an endless conveyor, means for transferring the lengths to the conveyor, means on said conveyor for receiving the lengths to move therewith, mechanism for bending the lengths during their travel on the conveyor to form shanks of equal length, and compression means for crimping said shanks while the pin is carried by the conveyor, said compression means including compression rolls having peripheral crimping members for crimping the shank over pins carried by the conveyor, means for maintaining said rolls in operative relation, and means for driving the different units of the machine in synchronism.

13. A machine for forming hairpins, comprising wire feeding mechanism, means for cutting wire in strands of uniform length, rotating carrier disks receiving said strands, a conveyor, mechanism for successively transferring the strands to the conveyor, means on the conveyor for moving the strands during the movement of the conveyor, bending means for forming the strands with parallel shanks of equal length, and comprising means located within the path of movement of the conveyor for crimping the shanks of the pin prior to discharge.

14. A machine for forming hairpins, comprising wire feeding mechanism, means for cutting wire in strands of uniform length, rotating carrier disks receiving said strands, a conveyor, mechanism for successively transferring the strands to the conveyor, means on the conveyor, bending means for forming the strands with parallel shanks of equal length, and comprising means located within the path of movement of the conveyor for crimping the shanks of the pin prior to discharge, and power mechanism for operating the different units of the machine in synchronism.

15. A machine for making hairpins, comprising wire feeding means, cutting mechanism for cutting the wire in strands of determined length, a carrier mechanism receiving said strands, a conveying mechanism, and means for transferring the strands from the carrier mechanism to the conveying mechanism comprising a shiftable element, means for bending the strands to form shanks of equal length while being moved by the conveyor, and a pair of dies having shafts therefor, and means for rotating said dies toward one another for crimping the shanks of the pin when moved between said dies by the conveyor.

16. A machine for making hairpins, comprising wire feeding means, cutting mechanism for cutting the wire in strands of determined length, a carrier mechanism receiving said strands, a conveying mechanism, and means for transferring the strands from the carrier mechanism to the conveying mechanism comprising a shiftable element, means for bending the strands to form shanks of equal length while being moved by the conveyor, and a pair of dies having shafts therefor, means for rotating said dies toward one another for crimping the shanks of the pin when moved between said dies by the conveyor, and means for driving the different elements of the machine in synchronism.

17. A machine for forming hairpins comprising wire feeding mechanism, means for cutting wire in strands of uniform length from which pins are to be formed, a carrier receiving said strands, a conveyor, said conveyor receiving strands from the carrier, means for moving said carrier and conveyor in consonance, and means for forming the strands with parallel shanks of equal length and for crimping the pins during movement with the conveyor.

SOLOMON H. GOLDBERG.